United States Patent
Mori (10) Patent No.: US 8,325,381 B2
(45) Date of Patent: Dec. 4, 2012

(54) PIXEL DATA RESOLUTION-ADJUSTMENT AND COMPOSITION IN OVERLAP AREA

(75) Inventor: Hiroshi Mori, Kawasaki (JP)

(73) Assignee: Canon Kabushiki Kaisha (JP)

( * ) Notice: Subject to any disclaimer, the term of this patent is extended or adjusted under 35 U.S.C. 154(b) by 542 days.

(21) Appl. No.: 12/273,683

(22) Filed: Nov. 19, 2008

(65) Prior Publication Data

US 2009/0128839 A1    May 21, 2009

(30) Foreign Application Priority Data

Nov. 20, 2007 (JP) ................................ 2007-300970

(51) Int. Cl.
*G06K 15/02*   (2006.01)

(52) U.S. Cl. ........ 358/1.2; 358/1.9; 358/1.18; 358/3.06; 358/3.28; 358/540

(58) Field of Classification Search ........................ None
See application file for complete search history.

(56) References Cited

U.S. PATENT DOCUMENTS

| | | | | |
|---|---|---|---|---|
| 5,134,495 | A * | 7/1992 | Frazier et al. | 382/299 |
| 5,140,314 | A * | 8/1992 | Stansfield et al. | 345/629 |
| 5,555,093 | A * | 9/1996 | Nagashima | 358/296 |
| 5,745,657 | A * | 4/1998 | Barry et al. | 358/1.2 |
| 6,025,927 | A * | 2/2000 | Honma | 358/1.18 |
| 6,147,709 | A * | 11/2000 | Martin et al. | 348/239 |
| 6,785,427 | B1 * | 8/2004 | Zhou | 382/294 |
| 6,937,772 | B2 * | 8/2005 | Gindele | 382/240 |
| 7,006,111 | B1 * | 2/2006 | Rothrock | 345/629 |
| 7,710,619 | B2 * | 5/2010 | Kawano et al. | 358/518 |
| 7,729,018 | B2 * | 6/2010 | Matsunoshita | 358/474 |
| 7,782,401 | B1 * | 8/2010 | Chou | 348/581 |
| 2004/0004699 | A1 * | 1/2004 | Kanatake | 355/45 |
| 2004/0190017 | A1 * | 9/2004 | Anson | 358/1.9 |
| 2006/0033756 | A1 * | 2/2006 | Freyhult | 345/629 |
| 2006/0158660 | A1 * | 7/2006 | Luttge et al. | 356/511 |
| 2008/0074537 | A1 * | 3/2008 | Kageyama et al. | 348/441 |

FOREIGN PATENT DOCUMENTS

| | | |
|---|---|---|
| JP | 10-243210 A | 9/1998 |
| JP | 11127339 A | 5/1999 |

OTHER PUBLICATIONS

Office Action issued in corresponding Japanese patent application No. 2007-300970, dated Nov. 14, 2011.

* cited by examiner

*Primary Examiner* — Dung Tran (74) *Attorney, Agent, or Firm* — Rossi, Kimms & McDowell LLP

(57) ABSTRACT

An image processing apparatus includes an input unit which inputs a plurality of image object data, an acquisition unit which acquires resolution information and area information, a generation unit which generates image data based on the resolution information and stores the image data in a memory unit, an extraction unit which extracts overlap area information and resolution information of each of the image objects, and a composition unit which reads out, from the memory unit, pixel data corresponding to a pixel position of interest in accordance with the area information, if a plurality of pixel data existing at the pixel position of interest are located in the overlap area, converts one of the plurality of pixel data in accordance with higher resolution information extracted by the extraction unit, composites the converted pixel data with the other pixel data, and outputs the pixel data.

7 Claims, 8 Drawing Sheets

PIXEL DATA RESOLUTION-ADJUSTMENT AND COMPOSITION IN OVERLAP AREA

BACKGROUND OF THE INVENTION

1. Field of the Invention

The present invention relates to a technique of overlaying a plurality of image objects.

2. Description of the Related Art

Needs for high-resolution printing have grown along with the recent increase in the image quality of printers. A user gets various impressions of image quality depending on the properties of data and objects of print applications. In, for example, a text or graphic, edge portions have very high impact, and output at a high resolution is required. For a photo image or the like, importance tends to be attached to tonality rather than resolution. To meet this requirement, raster processing is recently used. Document data mainly containing a text is output at a high resolution to maintain the image quality. Document data such as a photo image is printed at a low resolution, thereby increasing the print speed.

However, when a text or graphic having a high resolution and a photo image having a low resolution are subjected to raster processing or rendering processing at different resolutions and overlaid directly, they are inadequately drawn.

To prevent this, Japanese Patent Laid-Open No. H10-243210 discloses an arrangement having two processing units for high-resolution processing and low-resolution processing. An area where an image object and a non-image object such as a text or graphic overlap each other undergoes low-resolution rendering processing that is used to render an image object. This processing is also applied to the non-image object, thereby overlaying the objects at a single resolution.

However, the above-described prior art has the following problems. First, since the rendering processing of each resolution is selected based on the attribute of an object, rendering processing of different resolutions cannot be performed for objects having the same attribute. For example, an image having higher priority on image quality such as an image to be used for design and a simple image for office applications have different characteristics even when the objects have the same "image" attribute. For this reason, a demand for changing the output resolution sometimes arises even when the attribute is the same. However, the conventional technique cannot deal with this case.

Additionally, if an object such as a text or graphic, which should be output at a high resolution, is converted into a low resolution for overlay processing, the image quality may be poor. However, overlay processing at a high resolution requires more resources such as a memory. The number of pixels to be subjected to the overlay processing also increases and affects the process speed. Hence, a method for efficiently implementing overlay processing at a higher resolution using little resources is demanded.

The present invention has been made in consideration of the above-described problems, and provides an image processing technique capable of speeding up image overlay processing at a low cost.

SUMMARY OF THE INVENTION

According to one aspect of the present invention, an image processing apparatus for processing input image object data and generating output image data, comprises: an input unit which inputs a plurality of image object data that are independent from each other; an acquisition unit which acquires resolution information and area information representing an output position of each of a plurality of image objects represented by the plurality of image object data; a generation unit which generates image data corresponding to each of the image object data on the basis of the resolution information of each of the plurality of image objects acquired by the acquisition unit and stores the image data in a memory unit; an extraction unit which, if an image object of interest overlaps another image object, extracts overlap area information representing an overlap area position between the image object of interest and the other image object, and resolution information of each of the image object of interest and the other image object; and a composition unit which scans coordinates of the generated output image data, reads out, from the memory unit, pixel data corresponding to a pixel position of interest at a scan position in accordance with the area information, if a plurality of pixel data existing at the pixel position of interest are located in the overlap area, converts one of the plurality of pixel data in accordance with higher resolution information extracted by the extraction unit, composites the converted pixel data with the other pixel data, and outputs the pixel data.

According to another aspect of the present invention, an image processing apparatus comprises: a generation unit which generates pixel data of each acquired layer in accordance with resolution information of each layer; and a processing unit which, if a resolution of pixel data of one layer generated by the generation unit is lower than a resolution of pixel data of another layer generated by the generation unit, performs resolution conversion processing for the pixel data of the one layer generated by the generation unit and overlay processing of overlaying the pixel data of the one layer which has undergone resolution conversion processing on the pixel data of the other layer generated by the generation unit.

According to still another aspect of the present invention, a printing apparatus comprises: a generation unit which generates pixel data of each acquired layer in accordance with resolution information of each layer; a processing unit which, if a resolution of pixel data of one layer generated by the generation unit is lower than a resolution of pixel data of another layer generated by the generation unit, performs resolution conversion processing for the pixel data of the one layer generated by the generation unit and overlay processing of overlaying the pixel data of the one layer which has undergone resolution conversion processing on the pixel data of the other layer generated by the generation unit; and a printing unit which executes printing based on the pixel data that has undergone the overlay processing of the processing unit.

According to yet another aspect of the present invention, a method of controlling an image processing apparatus for processing input image object data and generating output image data, comprises: the input step of inputting a plurality of image object data that are independent from each other; the acquisition step of acquiring resolution information and area information representing an output position of each of a plurality of image objects represented by the plurality of image object data; the generation step of generating image data corresponding to each of the image object data on the basis of the resolution information of each of the plurality of image objects acquired in the acquisition step and storing the image data in a memory unit; the extraction step of, if an image object of interest overlaps another image object, extracting overlap area information representing an overlap area position between the image object of interest and the other image object, and resolution information of each of the image object of interest and the other image object; and the composition step of scanning coordinates of the generated output image data, reading out, from the memory unit, pixel data corresponding to a pixel position of interest at a scan position in accordance with the area information, if a plurality of pixel data existing at the pixel position of interest are located in the overlap area, converting one of the plurality of pixel data in accordance with higher resolution information extracted in the extraction step, compositing the converted pixel data with the other pixel data, and outputting the pixel data.

According to still yet another aspect of the present invention, a method of controlling an image processing apparatus, comprises: the generation step of generating pixel data of each acquired layer in accordance with resolution information of each layer; and the processing step of, if a resolution of pixel data of one layer generated in the generation step is lower than a resolution of pixel data of another layer generated in the generation step, performs resolution conversion processing for the pixel data of the one layer generated in the generation step and overlay processing of overlaying the pixel data of the one layer which has undergone resolution conversion processing on the pixel data of the other layer generated in the generation step.

According to the present invention, it is possible to provide an image processing technique capable of speeding up image overlay processing at a low cost.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings. Note that the following embodiments are not intended to limit the scope of the invention, but are merely examples.

(First Embodiment)

As an image processing apparatus according to the first embodiment of the present invention, an image processing system including a personal computer (PC) and a color laser beam printer (printer) will be exemplified below.

<System Arrangement>

Figure 1:
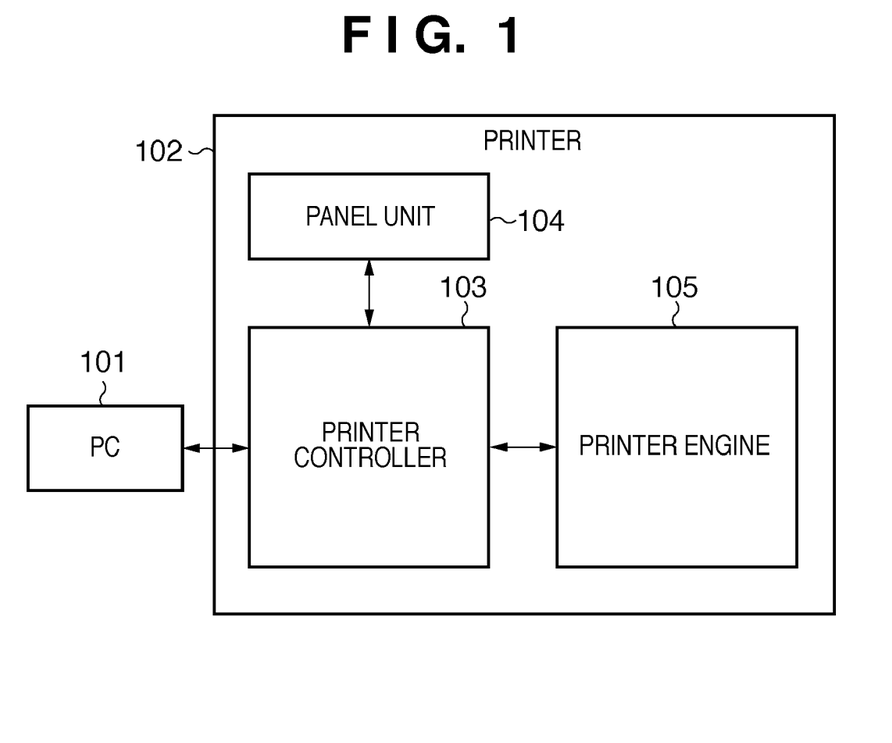
FIG. 1 is a block diagram showing the schematic arrangement of an image processing system according to the first embodiment.

FIG. 1 is a block diagram showing the schematic arrangement of the image processing system according to the first embodiment.

The image processing system mainly includes a PC 101 serving as a data processing apparatus and a printer 102 serving as an image printing apparatus. The PC 101 outputs image data to the printer 102 and controls the printer 102. As the printer 102, a laser beam printer (LBP) will be explained here. However, the applicable image printing apparatus is not limited to an LBP, and a printer of any other printing scheme such as an inkjet printer may be used.

The printer 102 includes a printer controller 103 which controls the units of the printer 102, and a printer engine 105 which executes printing on a printing medium such as a paper sheet. The printer 102 also includes a panel unit 104 serving as a user interface (UI) which displays information for the user and receives inputs from the user.

The printer controller 103 generates raster data (bitmap data) of each page based on image data included in a control code (e.g., page description language) supplied from the PC 101 and sends the raster data to the printer engine 105.

The printer engine 105 forms a latent image on a photosensitive drum based on the raster data supplied from the printer controller 103, and transfers and fixes the latent image onto a printing medium (by electrophotography), thereby printing the image on the printing medium.

The panel unit 104 is used as an UI. The user can instruct the printer 102 to perform an operation by operating the panel unit 104. The panel unit 104 displays the process contents of the printer 102 or warning contents to the user.

Figure 2:
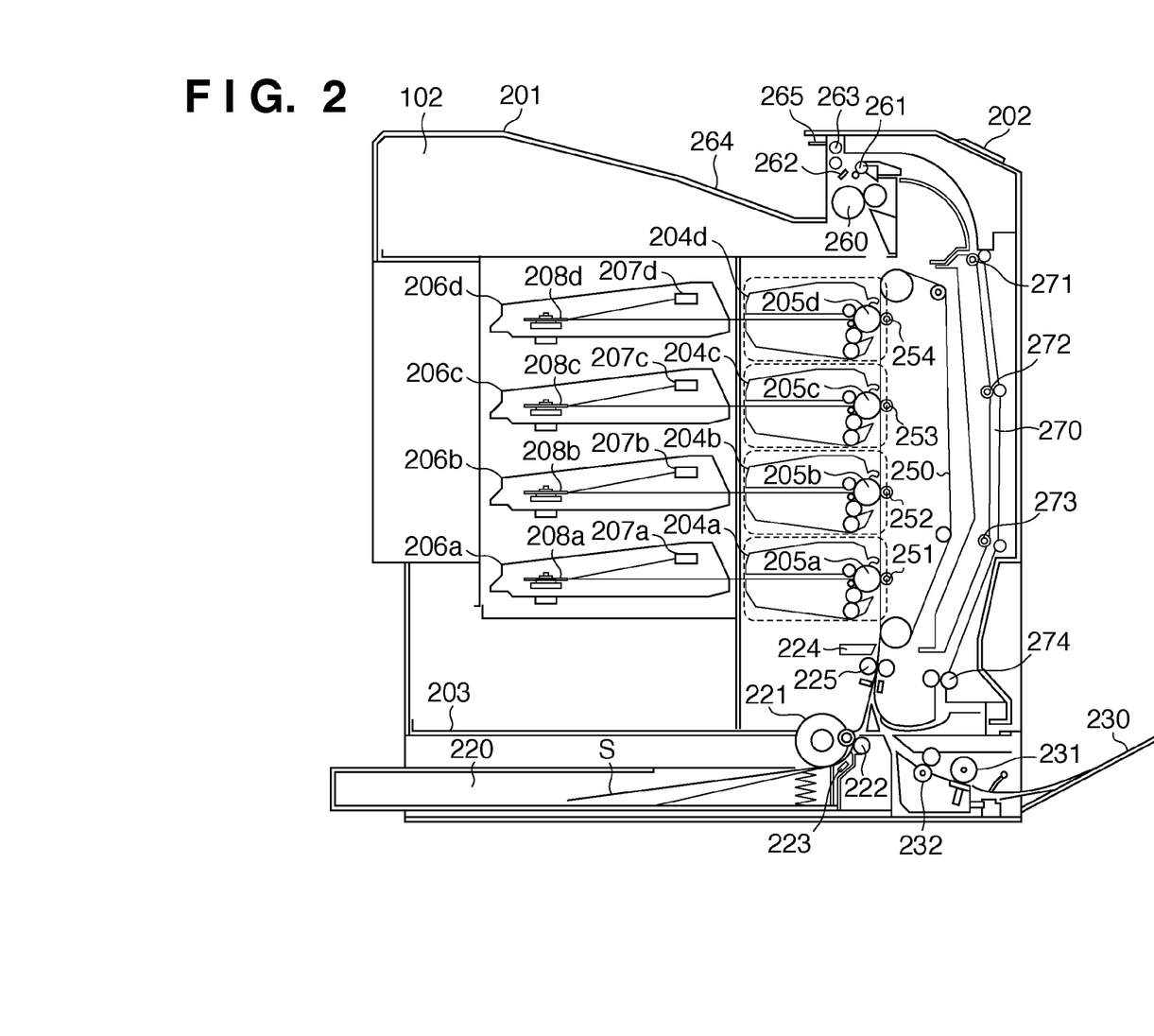
FIG. 2 is a sectional view for explaining the arrangement of a tandem printer 102.

FIG. 2 is a sectional view for explaining the arrangement of the tandem printer 102. FIG. 2 shows an example of a color printer which uses four color toners: yellow (Y), magenta (M), cyan (C), and black (K).

Reference numeral 201 denotes a printer housing. An operation panel 202 includes switches to be used by the user to input various kinds of instructions, and an LCD to display a message or printer setup contents. A board storage unit 203 stores a board which constitutes the electronic circuits of the printer controller 103 and the printer engine 105.

A paper cassette 220 holds paper sheets (printing media) S and has a mechanism for electrically detecting the paper size via a partition plate (not shown). A cassette clutch 221 has a cam which picks up the uppermost one of the paper sheets S stacked on the paper cassette 220 and conveys the picked-up paper sheet S to a feed roller 222 by a driving force transmitted from a driving unit (not shown). The cam intermittently rotates in every paper feed to feed one paper sheet S per revolution. A sheet detection sensor 223 detects the amount of paper sheets S held in the paper cassette 220.

The feed roller 222 conveys the leading edge of the paper sheet S up to a registration shutter 224. The registration shutter 224 can stop paper feed by pressing the paper sheet S.

Reference numeral 230 denotes a manual feed tray; and 231, a manual feed clutch. The manual feed clutch 231 is used to convey the leading edge of the paper sheet S up to a manual feed roller 232. The manual feed roller 232 is used to convey the leading edge of the paper sheet S up to the registration shutter 224. The paper sheet S to be used to print an image is selectively supplied from one of the feed units, that is, the paper cassette 220 and the manual feed tray 230.

The printer engine 105 communicates with the printer controller 103 in accordance with a predetermined communication protocol and selects one feed unit from the paper cassette 220 and the manual feed tray 230 in accordance with an instruction from the printer controller 103. The printer engine 105 also conveys the paper sheet S from the selected feed unit to the registration shutter 224 in accordance with a print start instruction. The printer engine 105 includes the feed units, a mechanism associated with the electrophotographic process such as latent image formation, transfer, and fixing, a discharge unit, and control units thereof.

Image printing units 204a, 204b, 204c, and 204d corresponding to the four colors cause the electrophotographic process including photosensitive drums 205a, 205b, 205c, and 205d, and toner holding units to form toner image of the respective colors on the paper sheet S. Laser scanner units 206a, 206b, 206c, and 206d supply image information by a laser beam to the image printing units.

A sheet conveyor belt 250 to convey the paper sheet S is flatly stretched for the image printing units 204a, 204b, 204c, and 204d by a plurality of rotating rollers 251 to 254 in the sheet conveyance direction (from below to above in FIG. 2). Chuck rollers 225 to which a bias is applied are arranged at the most upstream portion to cause the sheet conveyor belt 250 to electrostatically chuck the paper sheet S. The four photosensitive drums 205a, 205b, 205c, and 205d are linearly arranged with respect to the belt conveyance plane, thereby forming an image forming unit. Each of the image printing units 204a, 204b, 204c, and 204d includes a charger and a developer sequentially surrounding the periphery of the photosensitive drum.

Each of laser units 207a, 207b, 207c, and 207d drives an internal semiconductor laser in accordance with an image signal (also called a VIDEO signal) sent from the printer controller 103 and emits a laser beam. The laser beams emitted by the laser units 207a, 207b, 207c, and 207d are scanned by polygon mirrors 208a, 208b, 208c, and 208d and form latent images on the photosensitive drums 205a, 205b, 205c, and 205d, respectively.

A fixing device 260 thermally fixes the toner images formed on the paper sheet S by the image printing units 204a, 204b, 204c, and 204d. A conveyance roller 261 conveys and discharges the paper sheet S. A discharge sensor 262 detects the discharge state of the paper sheet S. Discharge rollers & double-sided printing conveyance path switching rollers 263 convey the paper sheet S in the discharge direction. If the conveyance instruction for the paper sheet S indicates discharge, the paper sheet S is directly discharged to a discharge tray 264. If the conveyance instruction indicates double-sided conveyance, the rotation direction is reversed for switch back immediately after the trailing edge of the paper sheet S has passed the discharge sensor 262, thereby conveying the paper sheet S to a double-sided printing conveyance path 270. A discharged sheet amount detection sensor 265 detects the amount of paper sheets S stacked on the discharge tray 264.

Reference numeral 270 denotes the double-sided printing conveyance path. The paper sheet S conveyed for double-sided printing by the discharge rollers & double-sided printing conveyance path switching rollers 263 is conveyed to the registration shutter 224 again by double-sided conveyance rollers 271 to 274. Then, an instruction to convey the paper sheet to the image printing units 204a, 204b, 204c, and 204d is waited for. The printer 102 can also include optional units such as optional cassettes and an envelop feeder.

Figure 3:
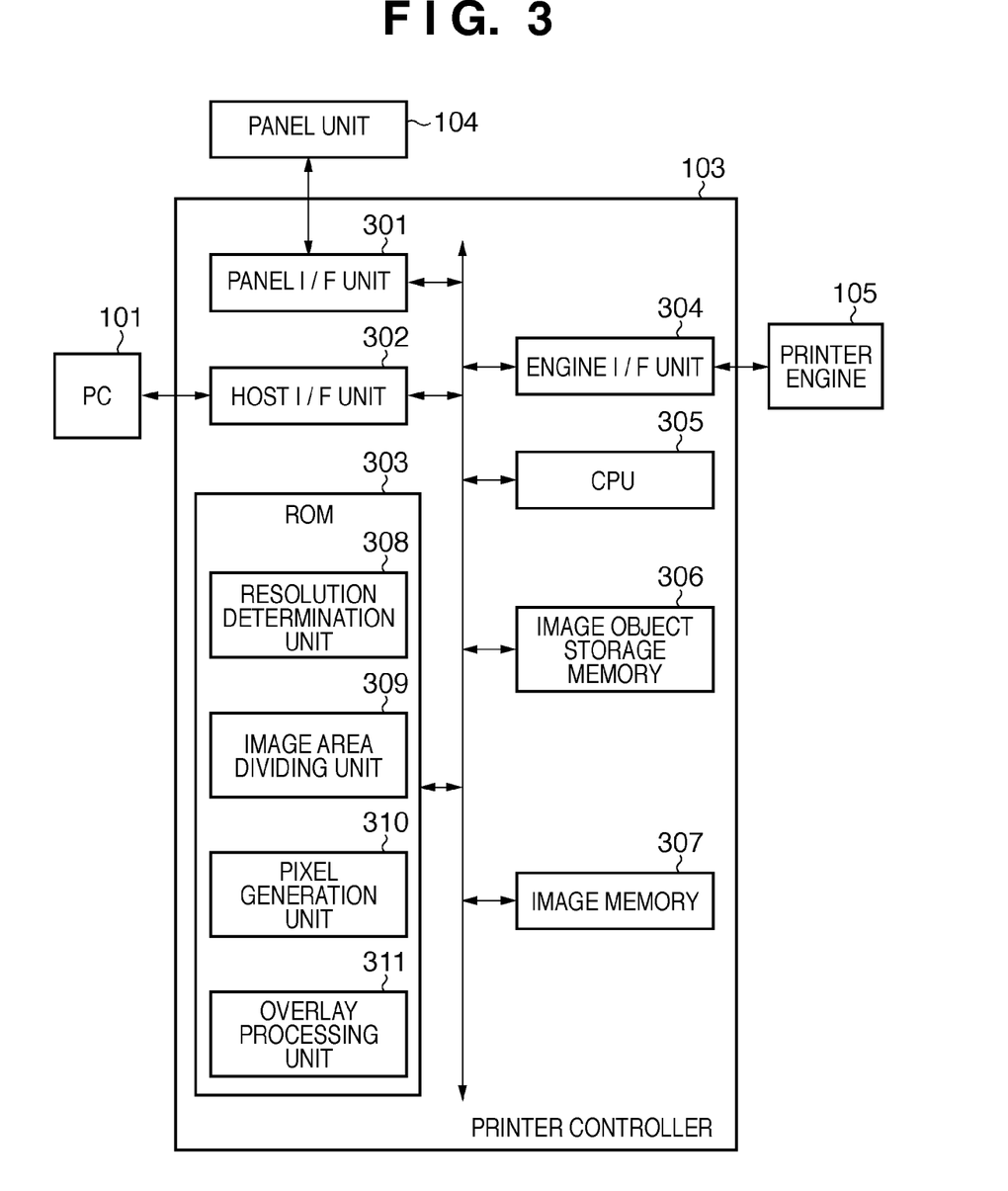
FIG. 3 is an internal block diagram of a printer controller included in the printer according to the first embodiment.

FIG. 3 is an internal block diagram of the printer controller included in the printer according to the first embodiment.

A panel interface unit 301 performs data communication with the panel unit 104. A host interface unit 302 is used for two-way communication connection to the PC 101 such as a host computer via a network. An engine interface unit 304 is used for communication connection to the printer engine 105.

A CPU 305 can confirm, via the panel interface unit 301, contents set or instructed on the panel unit 104 by the user. The CPU 305 can also confirm the state of the printer engine 105 via the engine interface unit 304. The CPU 305 also controls devices connected to a CPU bus 320 based on control program codes held in a ROM 303.

An image object storage memory 306 is an object memory which stores an image object generated based on data input from the PC 101. An image memory 307 temporarily holds raster data (pixel data) generated from an image object. The CPU bus 320 includes address, data, and control buses.

The ROM 303 stores various kinds of drawing processing programs to be executed by the CPU 305. A resolution determination unit 308 determines the resolution and area of input image data. Actually, the resolution determination unit 308 determines the resolution and area of each image object.

Figure 4A:
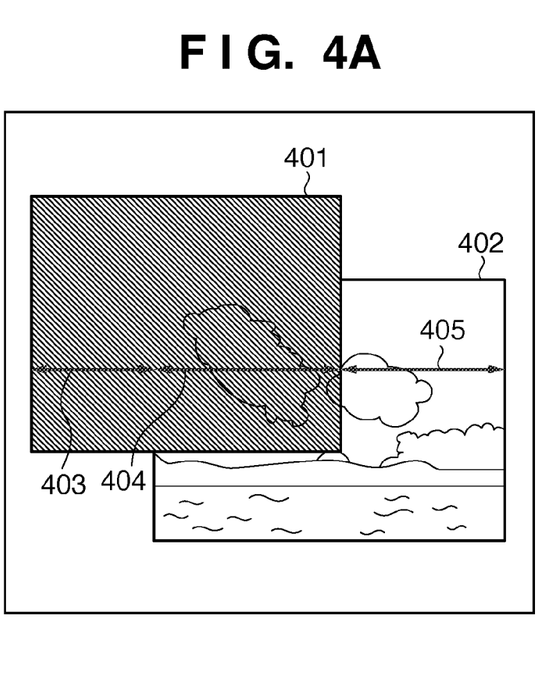
FIGS. 4A to 4C are views showing examples of image data input from a PC.
Figure 4B:
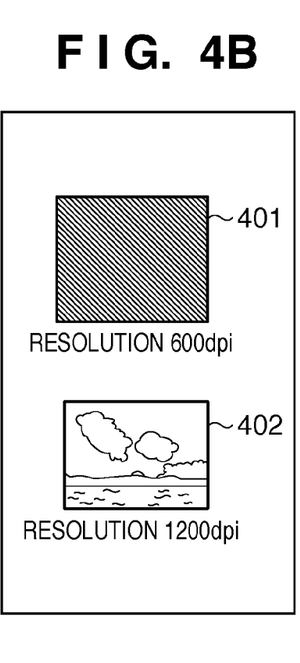
Figure 4C:
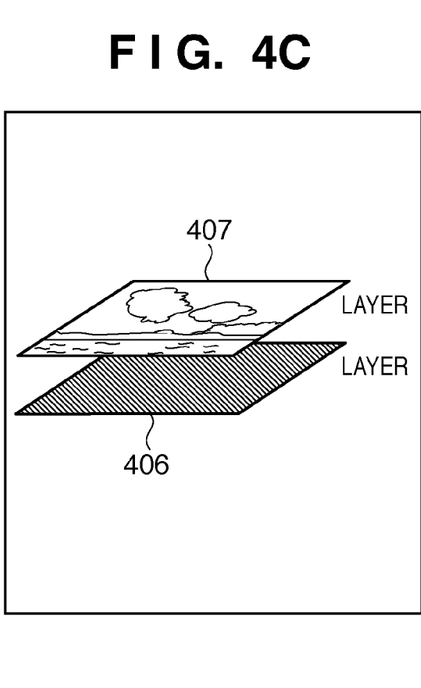

FIGS. 4A to 4C are views showing examples of image data input from the PC. Input image data includes, for example, data (image object data) corresponding to two image objects 401 and 402, as shown in FIG. 4A. Note that resolution information and area information to specify the output position in output image data are independently set for each image object.

For example, the image object 401 is a tile image for which a resolution of 600 dpi is designated. Hence, the resolution determination unit 308 determines the resolution of the area of the tilt image as 600 dpi. The image object 402 is a photo image having a resolution of 1,200 dpi. Hence, the resolution determination unit 308 determines the resolution of the area of the image as 1,200 dpi.

An image area dividing unit 309 divides image data into units for processing by a pixel generation unit 310 and an overlay processing unit 311 (to be described later). More specifically, the image area dividing unit 309 divides input image data into divided areas (Run) 403, 404, and 405 (FIG. 4A) which are areas between the edges of the image objects, and layers 406 and 407 (FIG. 4C) in the Runs. Additionally, the image area dividing unit 309 also adds resolution information to the layers 406 and 407 and associates them with the Runs.

For example, when drawing a certain length (the length of areas 403, 404, and 405) in the main scanning direction, the image data is divided into Runs 403, 404, and 405 which are separated at the overlap edges of the image objects. Pieces of Run information 501, 502, and 503 associated with the layers 406 and 407 included in the Runs are generated for the respective Runs separated at the edges. For example, for the Run 404 where the layers 406 and 407 overlap, Run information including the layers 406 and 407 is generated, like the Run information 502. That is, it is important to associate each Run with a layer holding resolution information. This will be described later in detail. This association enables resolution switching processing in each Run.

Figure 5:
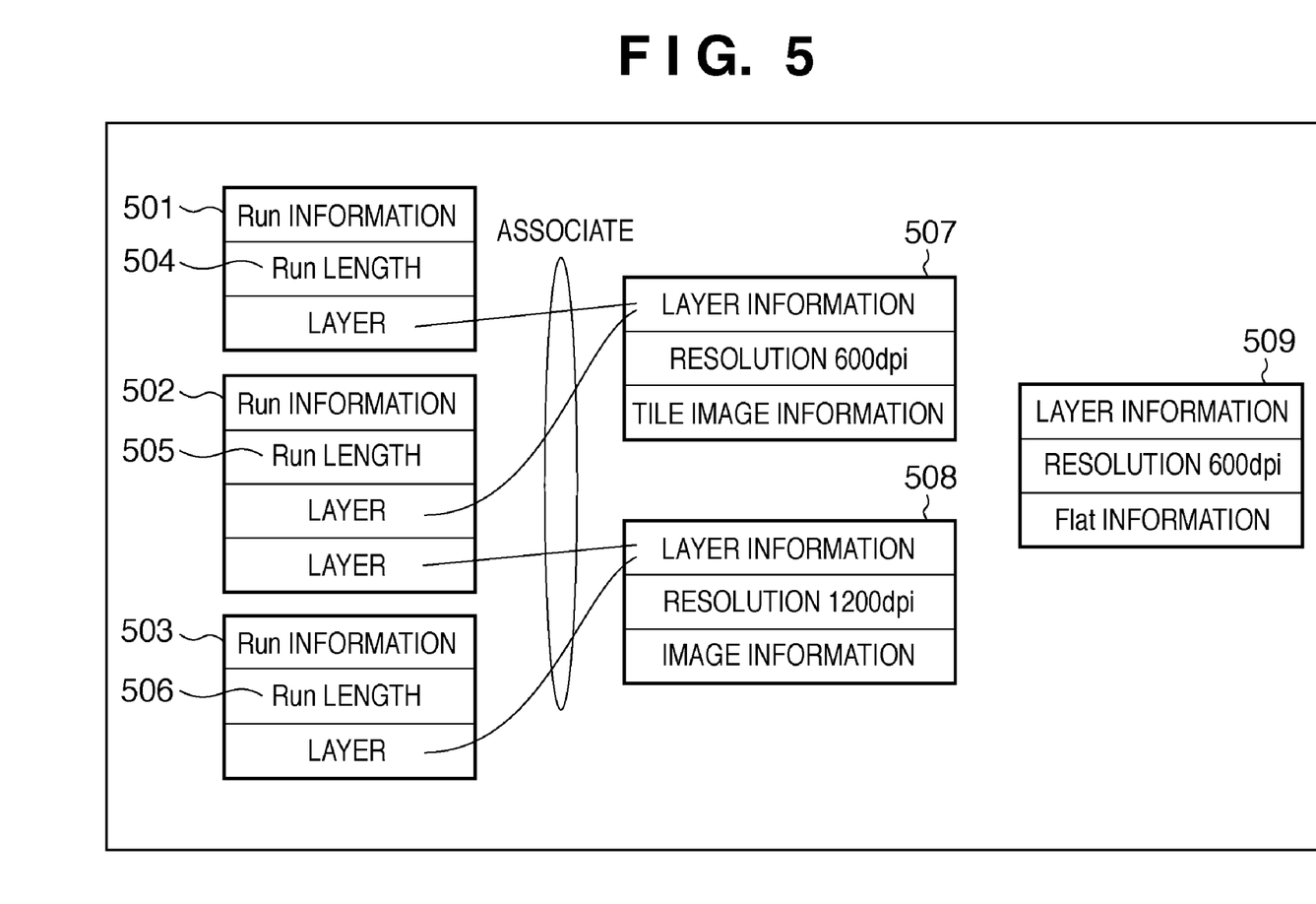
FIG. 5 is a view for explaining the data format of Run information and that of layer information.

FIG. 5 is a view for explaining the data format of Run information and that of layer information.

The pieces of Run information 501, 502, and 503 correspond to the Runs 403, 404, and 405, respectively.

As is apparent from FIG. 4A, the Run 403 is an area where only the tile image 401 is drawn. Hence, the Run information 501 stores the information of layer information 507. The pixel length of the Run 403 is also stored. On the other hand, the Run 404 is an area (overlap area position) where the tile image 401 and the photo image 402 overlap. Hence, the Run information 502 stores the information of the layer information 507 and layer information 508 (overlap area information). The pixel length of the Run 404 is also stored. The Run 405 is an area where only the photo image 402 is drawn. Hence, the Run information 503 stores the information of the layer information 508. The pixel length of the Run 405 is also stored.

The layer information 507 is fill information representing the tile image 401. The layer information 507 includes resolution information determined by the resolution determination unit 308 and information necessary for drawing the tile image 401. The layer information 508 is fill information representing the photo image 402. The layer information 508 includes resolution information determined by the resolution determination unit 308 and information necessary for drawing the photo image 402.

Layer information 509 is fill information representing Flat (area filled in a single color), although not illustrated in FIGS. 4A to 4C. The layer information 509 includes resolution information determined by the resolution determination unit 308 and information necessary for drawing Flat. However, since Flat is drawn in a single color independently of the pixel length, the resolution information is unnecessary and can be omitted.

The pixel generation unit 310 generates the pixels of the layers 406 and 407 in each of the divided Runs 403, 404, and 405. The pixel generation will be described later in detail.

The overlay processing unit 311 executes processing of overlaying the pixel information of the layers generated by the pixel generation unit 310. The overlay processing will be described later in detail.

<System Operation>

Figure 6:
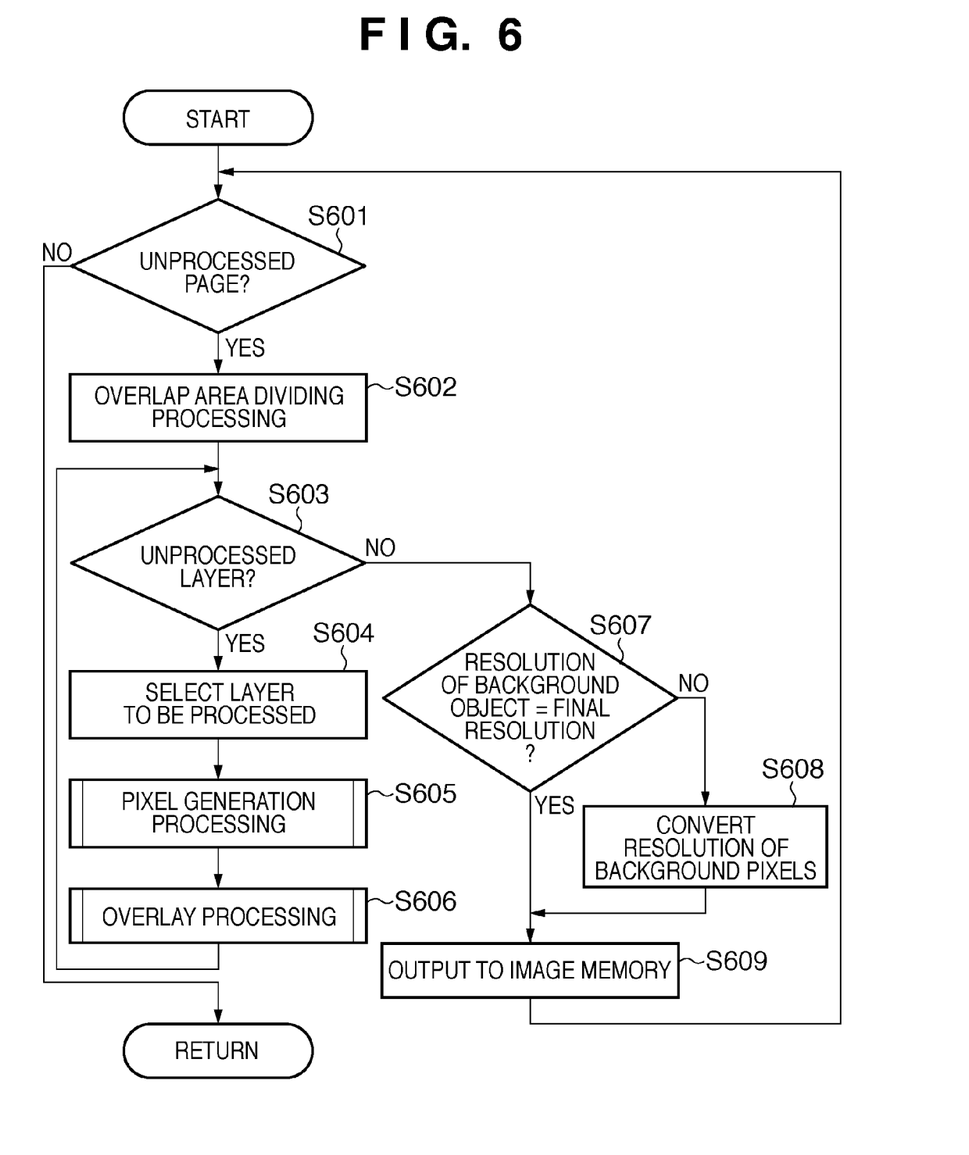
FIG. 6 is an overall flowchart of image processing executed by the printer according to the first embodiment.

FIG. 6 is an overall flowchart of image processing executed by the printer according to the first embodiment. The following steps are implemented by causing the CPU 305 to execute the control program codes stored in the ROM 303 and control the units of the printer.

In step S601, the CPU determines whether data that has not yet undergone page processing (image processing) remains in data input from the PC 101. If unprocessed data remains, the page of the process target is set, and the process advances to step S602.

If no data remains, the processing ends. In the example to be described here, the pages shown in FIG. 4A are set as process targets.

In step S602, the image area dividing unit 309 divides the image area of the page set in step S601. More specifically, data is generated by dividing the input image data into pieces of Run information 501, 502, and 503 and layer information 507 and 508, as described above.

In step S603, referring to the Run information generated by the image area dividing unit 309, the CPU determines whether layers which have not undergone pixel generation and overlay processing exist. When processing, for example, the Run information 502, the CPU determines whether pixel generation processing and overlay processing are executed for the pieces of layer information 507 and 508. If no such layers exist, the process advances to step S606. If such layers exist, the process advances to step S604.

In step S604, the CPU selects a process target layer from the layers determined to be unprocessed in step S603. The layers are selected sequentially from the lowermost one because drawing by overlay processing is generally performed sequentially from the lowermost one of the plurality of overlapping layers.

In step S605, the pixels of the layer selected in step S604 are generated. Details of pixel generation processing will be described laser with reference to FIG. 7.

In step S606, the pixel data generated in step S605 is overlaid on background pixel data. In the first overlay processing, the background pixel data indicates white-filled data. From the second overlay processing, the background pixel data indicates pixel data obtained by preceding overlay processing.

In step S607, the CPU determines whether the pixel data generated in step S606 has the same resolution as the final resolution. When processing, for example, the Run information 502, this step is executed when the overlay processing of the pieces of layer information 507 and 508 is ended. That is, the determination is done for the pixel data output after completion of overlay processing of all layers corresponding to the divided Runs. If it is determined that the resolution is the same, the process advances to step S609. Otherwise, the process advances to step S608.

In step S608, the resolution of the pixel data (background pixel data) generated in step S606 is converted into that of the output image data which is to be finally output. The resolution conversion processing is done using a known technique.

In step S609, the pixel data (background pixel data) generated in step S606 or S608 is output to the image memory, and the process returns to step S601.

Figure 7:
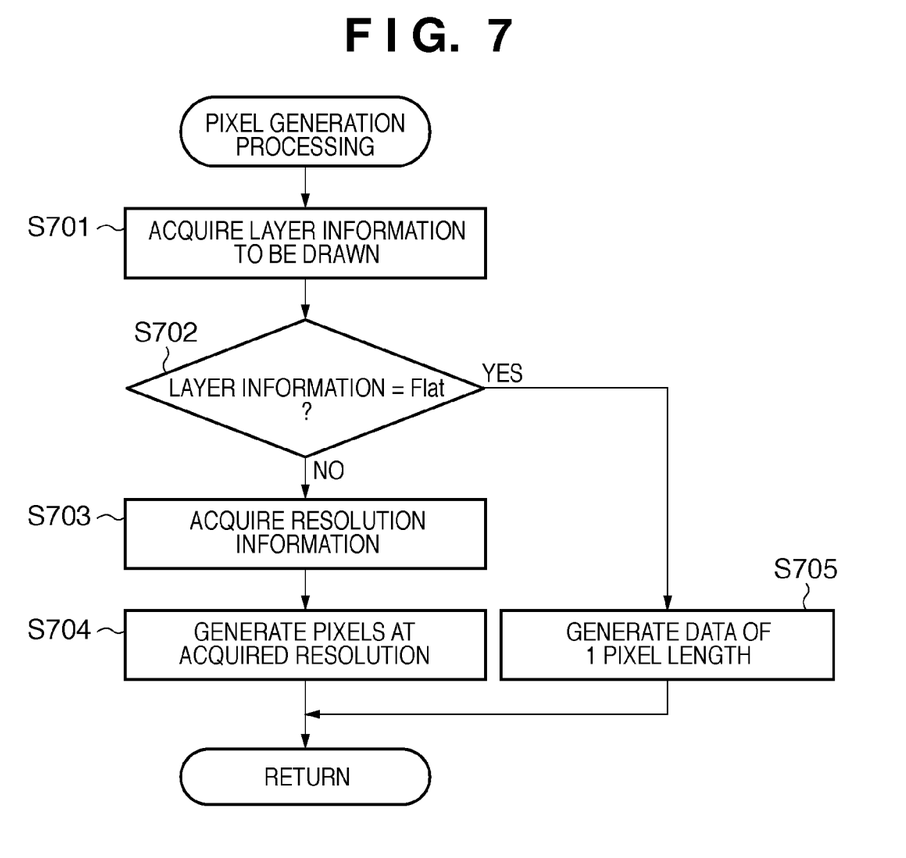
FIG. 7 is a detailed flowchart of pixel generation processing.

FIG. 7 is a detailed flowchart of pixel generation processing.

In step S701, the layer information (e.g., layer information 507) of the process target layer selected in step S604 is acquired.

In step S702, the CPU determines based on the layer information acquired in step S701 whether the image is Flat. The information representing whether the image is Flat or not is contained in the layer information, as shown in FIG. 5. For this reason, the determination is done based on the information. If the image is Flat, the process advances to step S705. Otherwise (i.e., if the image is a tile image or photo image), the process advances to step S703.

In step S703, resolution information is acquired based on the layer information acquired in step S701.

In step S704, pixel data is generated from the tile image or photo image in accordance with the resolution information acquired in step S703. That is, data containing pixels in number corresponding to the resolution is generated.

In step S705, data of one pixel is generated independently of the resolution. This is because generation of 1-pixel data suffices as the whole Flat image requires the same data as the data of a specific pixel.

That is, even when the resolution should finally match that of a high-resolution layer, the pixel generation processing is strictly performed to create data having a low resolution, unlike the prior art. At the time of overlay processing to be described later, the images are overlaid while raising the resolution. If the image is Flat, only 1-pixel data is generated independently of the resolution. The overlay processing is executed by recursively using the generated pixels, as will be described later.

In such pixel generation processing, the number of generated pixels is smaller than in the conventional method. It is consequently possible to largely reduce the necessary memory capacity. As described above, the pixel generation processing is performed for each Run. It is therefore possible to determine the resolution in a minimum unit regardless of the degree of overlap of objects and reduce the processing.

Figure 8:
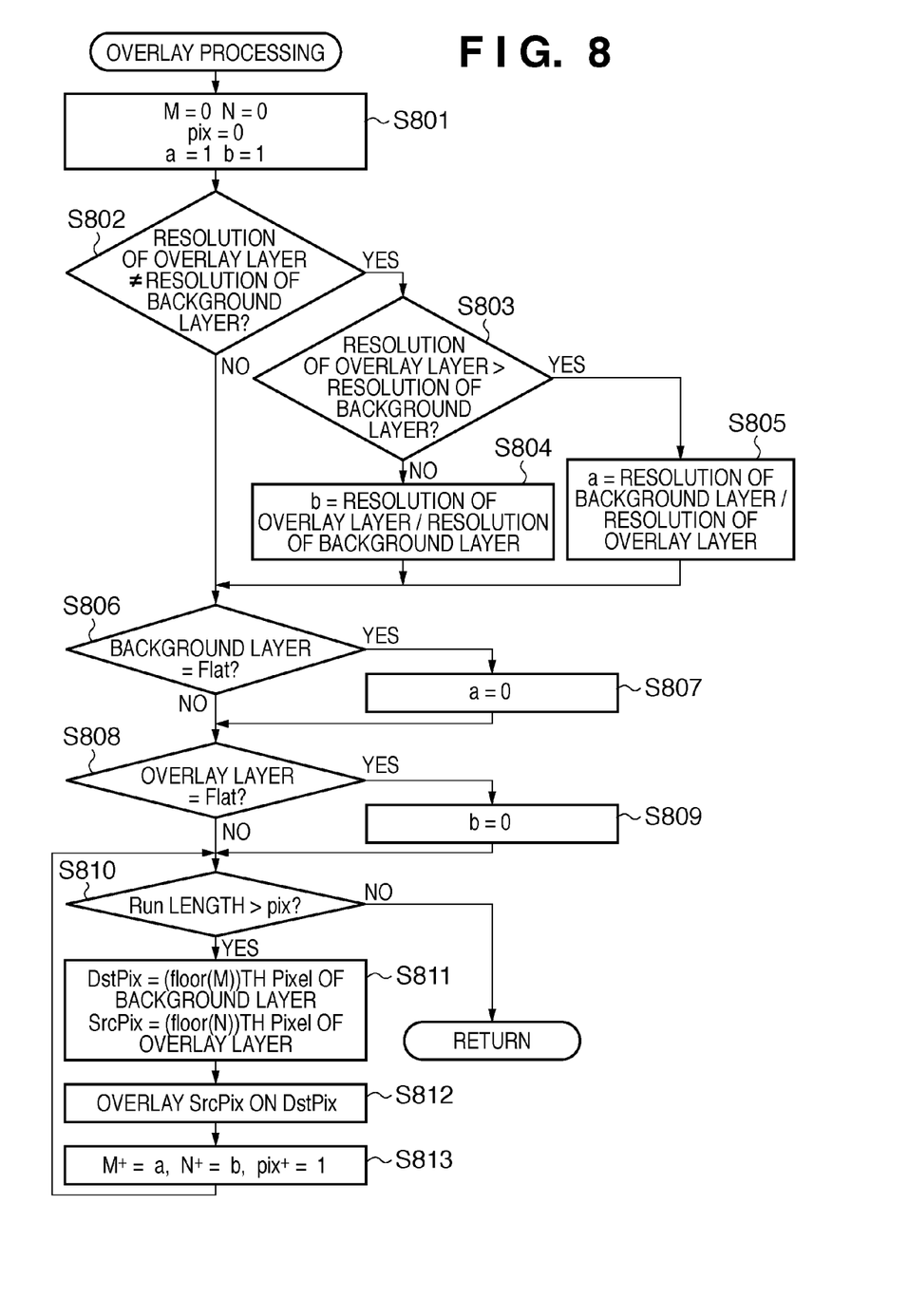
FIG. 8 is a detailed flowchart of overlay processing.

FIG. 8 is a detailed flowchart of overlay processing.

In step S801, various values (M, N, pix, a, and b) to be used for overlay processing are initialized. M is a value representing the pixel offset of a background layer to be processed target. N is a value representing the pixel offset of an overlay (image object of interest) layer to be processed target. The pixel offset indicates the start position of image pixel data to be used by each layer. The value pix represents the number of pixels for which the processing of overlaying the overlay layer on the background layer is completed. The value a represents the enlargement ratio of the background layer. The value b represents the enlargement ratio of the overlay layer.

In step S802, the resolution of the background layer as the target of overlay processing is compared with that of the layer to be overlaid. More specifically, the resolution of an unprocessed layer in one or more layers included in Run information is extracted from associated layer information and compared with the resolution of the background layer (processed layer). If the resolutions are equal, the process advances to step S806. If the resolutions are different, the process advances to step S803.

In step S803, which has a higher resolution, the background layer as the target of overlay processing or the layer to be overlaid, is identified. If the background layer is a higher resolution, the process advances to step S804. If the background layer has a lower resolution, the process advances to step S805.

In step S804, the enlargement ratio b of the background layer is calculated. Low-resolution pixel data is enlarged using the enlargement ratio b, thereby generating pixel data having the same resolution as high-resolution pixel data, as will be described later.

In step S805, the enlargement ratio a of the layer to be overlaid is calculated. Similarly, low-resolution pixel data is enlarged using the enlargement ratio a, thereby generating pixel data having the same resolution as high-resolution pixel data.

In step S806, the CPU determines whether the background layer is Flat. If the background layer is Flat, the process advances to step S807. Otherwise (i.e., if the layer is a tile image or photo image), the process advances to step S808.

In step S807, the enlargement ratio a is set to 0. That is, since Flat uses a single pixel value in the overall area (Run) between Edges, setting is done to prepare and reuse only the value of one pixel (single pixel).

In step S808, the CPU determines whether the overlay layer is Flat. If the overlay layer is Flat, the process advances to step S809. Otherwise, the process advances to step S810.

In step S809, the enlargement ratio b is set to 0. That is, since Flat uses a single pixel value in the overall area (Run) between Edges, setting is done to prepare and reuse only the value of one pixel (single pixel).

In step S810, the CPU determines whether overlay processing has been executed for a number of times equal to the number of pixels for the Run length corresponding to Run that is currently being processed. That is, the CPU determines whether overlay processing in the Run of interest is completed. The variable pix in FIG. 8 indicates the number of pixels for which the processing of overlaying the overlay layer on the background layer is completed. Hence, when pix is Run or more, the loop in step S810 ends, and the processing ends.

In step S811, a plurality of (in this case, two) pixel data corresponding to the pixels to be overlaid (pixel position of interest) is acquired from each of the background and overlay layers. That is, pixels corresponding to the pixel offset are acquired from each of the background and overlay layers. A function floor( ) shown in FIG. 8 is used to extract the integer part of a given argument. Hence, pixels are acquired from each of the background and overlay layers in consideration of the pixel offset.

In step S812, the pixels of the background and overlay layers, which are acquired in step S811, are overlaid (composition processing). The overlay processing includes, for example, ROP processing and transmission value calculation processing.

In step S813, the pixel offsets M and N, and the index pix to be used in the overlay processing are updated. The pixel offset M is incremented by a, the pixel offset N is incremented by b, and the index pix is incremented by 1. The values are thus set, and the coordinates of the output image data are sequentially scanned. Steps S811 to S813 are executed at each scan position, thereby implementing resolution conversion processing of low-resolution pixel data. For high-resolution pixel data, pixel data with the same resolution is acquired. However, any other method may be used for resolution conversion processing.

Assume that the resolution of the overlay layer is 600 dpi, and the resolution of the background layer is 1,200 dpi. In this case, the process advances from step S803 to step S804 to set $b = {}^{600}/_{1200} = \frac{1}{2}$. In steps S811 to S813, overlay processing is executed while updating the overlay layer in each pixel and the background layer in ½ pixels. As a result, the overlay layer is overlaid on the background layer which is enlarged to twice.

As described above, in the image processing system according to the first embodiment, processing is performed not in each object but in each layer (Run) between edges. For this reason, if a plurality of overlapping layers includes only one high-resolution layer, overlay processing can be done using the resolution of each layer (i.e., the resolution lower than that of the high-resolution layer). For this reason, the resolution can be raised immediately before overlay processing. This implements image overlay processing using a smaller memory capacity. It is therefore possible to reduce the cost of the system or apparatus.

Since the process data amount decreases as a result, the processing is expected to speed up. This can provide a very large effect, particularly when complex overlay processing (ROP processing or transmission processing) exists, or many layers overlap.

The processing has been described as processing in the printer 102. However, for example, software that runs on the PC 101 may execute the same overlay processing. The software includes a drawing module in the operating system (OS) as well as application software or driver software.

<Other Embodiments>

The embodiments of the present invention have been described above in detail. The present invention is applicable to a system including a plurality of devices or an apparatus including a single device.

The present invention is also achieved even by supplying a program which implements the functions of the above-described embodiments to the system or apparatus directly or from a remote site and causing the system or apparatus to read out and execute the supplied program codes. Hence, the program code itself, which is installed in a computer to implement the functional processing of the present invention by the computer, is also incorporated in the technical scope of the present invention.

In this case, the program can take any form such as an object code, a program to be executed by an interpreter, or script data to be supplied to the OS as long as the functions of the program can be obtained.

Examples of the recording medium to supply the program are a Floppy® disk, hard disk, optical disk (CD, DVD), magnetooptical disk, magnetic tape, nonvolatile memory card, and ROM.

The functions of the above-described embodiments are implemented when the computer executes the readout program. The functions of the above-described embodiments are also implemented when, for example, the OS running on the computer partially or wholly executes actual processing based on the instructions of the program.

The program read out from the recording medium is written in the memory of a function expansion board inserted into the computer or a function expansion unit connected to the computer and executed. Then, the CPU of the function expansion board or function expansion unit partially or wholly executes actual processing based on the instructions of the program, thereby implementing the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-300970, filed Nov. 20, 2007, which is hereby incorporated by reference herein in its entirety.

What is claimed is:

1. An image processing apparatus, comprising:
an input unit which inputs a plurality of image object data that are independent from each other;
an acquisition unit which acquires resolution information and area information representing an output position of each of a plurality of image objects represented by the plurality of image object data;
a generation unit which generates image data corresponding to each of the image object data on the basis of the resolution information of each of the plurality of image objects acquired by said acquisition unit and stores the generated image data in a memory unit;
an extraction unit which, if an image object of interest overlaps another image object, extracts overlap area information representing an overlap area position between the image object of interest and said another image object, and resolution information of each of (1) the image object of interest and (2) said another image object; and
a composition unit which:
(a) scans coordinates of the generated image data,
(b) reads out, from the memory unit, pixel data corresponding to a pixel position of interest at a scan position in accordance with the area information, and
(c) if a plurality of pixel data existing at the pixel position of interest is located in the overlap area, (i) converts one of the plurality of pixel data in accordance with higher resolution information extracted by said extraction unit, (ii) composites the converted pixel data with other pixel data of the plurality of pixel data, and (iii) outputs the composited pixel data.

2. The apparatus according to claim 1, wherein said generation unit generates image data of a single pixel for image object data filled in a single color, and stores the generated image data of the single pixel in the memory unit.

3. The apparatus according to claim 2, wherein said composition unit, as part of executing the composite, recursively uses the generated image data of the single pixel for the image object data filled in the single color.

4. A method of controlling an image processing apparatus, comprising:
an input step of inputting a plurality of image object data that are independent from each other;
an acquisition step of acquiring resolution information and area information representing an output position of each of a plurality of image objects represented by the plurality of image object data;
a generation step of generating image data corresponding to each of the image object data on the basis of the resolution information of each of the plurality of image objects acquired in the acquisition step and storing the generated image data in a memory unit;
an extraction step of, if an image object of interest overlaps another image object, extracting overlap area information representing an overlap area position between the image object of interest and said another image object, and resolution information of each of (1) the image object of interest and (2) said another image object; and
a composition step of:
(a) scanning coordinates of the generated image data,
(b) reading out, from the memory unit, pixel data corresponding to a pixel position of interest at a scan position in accordance with the area information, and
(c) if a plurality of pixel data existing at the pixel position of interest is located in the overlap area, (i) converting one of the plurality of pixel data in accordance with higher resolution information extracted in the extraction step, (ii) compositing the converted pixel data with other pixel data of the plurality of pixel data, and (iii) outputting the composited pixel data.

5. A non-transitory computer-readable recording medium storing a program that, when executed by a computer, causes the computer to perform a method of controlling an image processing apparatus, the program comprising instructions for:
an input step of inputting a plurality of image object data that are independent from each other;
an acquisition step of acquiring resolution information and area information representing an output position of each of a plurality of image objects represented by the plurality of image object data;
a generation step of generating image data corresponding to each of the image object data on the basis of the resolution information of each of the plurality of image objects acquired in said acquisition step and storing the generated image data in a memory unit;
an extraction step of, if an image object of interest overlaps another image object, extracting overlap area information representing an overlap area position between the image object of interest and said another image object, and resolution information of each of (1) the image object of interest and (2) said another image object; and
a composition step of:
(a) scanning coordinates of the generated image data,
(b) reading out, from the memory unit, pixel data corresponding to a pixel position of interest at a scan position in accordance with the area information, and
(c) if a plurality of pixel data existing at the pixel position of interest are located in the overlap area, (i) converting one of the plurality of pixel data in accordance with higher resolution information extracted in said extraction step, (ii) compositing the converted pixel data with said other pixel data, and (iii) outputting the composited pixel data.

6. An image processing apparatus, which performs overlay processing for a plurality of layered image object data contained in image data and generates output image data, the image processing apparatus comprising:
an input unit which inputs image data containing a plurality of layered image object data;
an acquisition unit which acquires resolution information of image object data in a layer for which the overlay processing is to be performed;
a generation unit which generates pixel data for the image object data in the layer, for which the overlay processing is to be performed, at a resolution indicated by the acquired resolution information, and stores the generated pixel data to a storing unit;

a setting unit which sets, if a resolution of a layer to be overlaid is higher than a resolution of a background layer, a value "a" to a value obtained by dividing the resolution of the background layer by the resolution of the layer to be overlaid, and a value "b" to "1", and sets, if the resolution of the layer to be overlaid is not higher than the resolution of the background layer, a value "a" to "1" and a value "b" to a value obtained by dividing the resolution of the layer to be overlaid by the resolution of the background layer;

an overlaying unit which overlays "a" successive pixels in the background layer and "b" successive pixels in the layer to be overlaid; and a control unit which controls to perform the generation of the pixel data by the generation unit and the overlaying of pixels by the overlaying unit until there are no unprocessed layers.

7. The apparatus according to claim 6, further comprising a printing unit which performs printing in accordance with output image data generated in accordance with the generation of pixel data by the generation unit and the overlaying of pixels by the overlaying unit.

* * * * *